Figure 1:
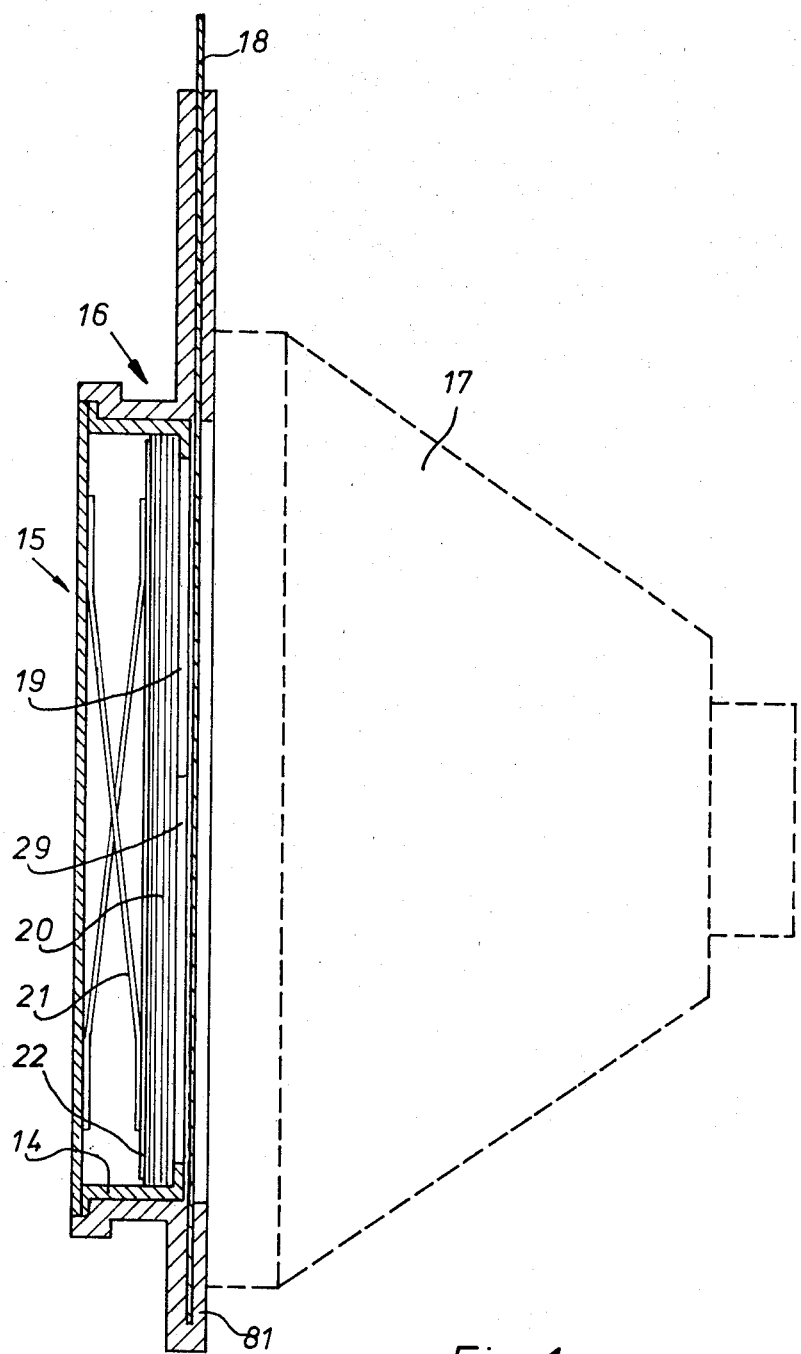

United States Patent [19]

Deconinck

[11] 4,388,992

[45] Jun. 21, 1983

[54] CONTAINER SUITABLE FOR HOLDING A STACK OF PHOTOGRAPHIC SHEETS

[75] Inventor: Hugo F. Deconinck, Deurne-Zuid, Belgium

[73] Assignee: AGFA-Gevaert N.V., Mortsel, Belgium

[21] Appl. No.: 299,012

[22] Filed: Sep. 3, 1981

[30] Foreign Application Priority Data

Sep. 8, 1980 [GB] United Kingdom ............... 8028898

[51] Int. Cl.³ ..................... B65D 85/30; G03B 17/26
[52] U.S. Cl. .................................. 206/455; 221/232; 312/71; 354/276; 354/283
[58] Field of Search ............... 206/455, 449, 556, 557, 206/578, 817, 820, 39, 39.4, 44 B, 45.31, 360, 409; 229/17 S; 221/307, 232, 308; 312/71, 50; 354/275, 277, 276, 283

[56] References Cited

U.S. PATENT DOCUMENTS

| | | | |
|---|---|---|---|
| 934,220 | 9/1909 | Sayles | 206/39 |
| 2,609,219 | 9/1952 | Marano | 312/50 |
| 3,930,264 | 12/1975 | Asano | 354/277 |
| 4,100,559 | 7/1978 | Wareham et al. | 354/277 |

OTHER PUBLICATIONS

R. W. Gunnell, "Prebuckle Back-Up Plate for Supply Cassette," *IBM Technical Disclosure Bulletin*, Aug. 1980, vol. 23, No. 3.

*Primary Examiner*—George E. Lowrance
*Assistant Examiner*—Jimmy G. Foster
*Attorney, Agent, or Firm*—William J. Daniel

[57] ABSTRACT

The container for a stack of photographic sheets comprises spring means for biasing the sheet stack away from the bottom wall of the container and against retaining means at the front of the container, which comprises a peripheral flange or lip entering over only marginal portions of the front sheet so that the latter can be photographically exposed to a light-image while in the container. The lip is interrupted at opposed regions to permit the sheet to buckle when subjected to buckling forces preparatory to removal of the sheet from the container. Detent means are provided on the inner face of the retaining lip adjacent a pair of corners to prevent the buckled sheet from returning to its original flat condition.

9 Claims, 19 Drawing Figures

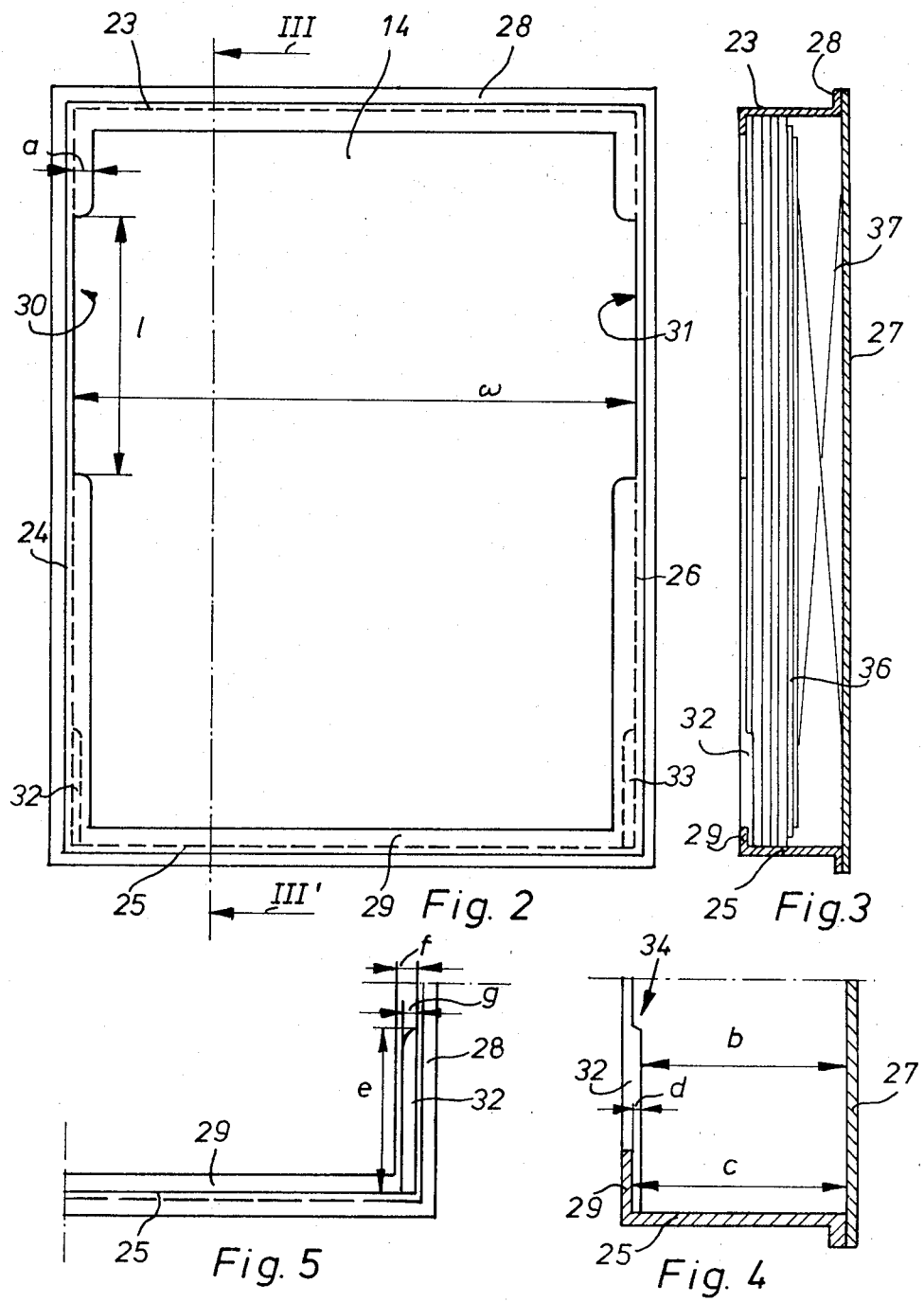

CONTAINER SUITABLE FOR HOLDING A STACK OF PHOTOGRAPHIC SHEETS

This invention relates to a container suitable for holding a stack of photographic film sheets.

In certain photographic work there is a need for a container for holding light-sensitive film sheets in such manner that the sheets can be exposed one by one to a light image, e.g. in a camera, while remaining in the container, and each sheet after its exposure can be fed from the container into a processing apparatus by an automatic feed mechanism. The invention provides a container which is suitable for this purpose.

According to the present invention there is provided a container for holding a stack of photographic film sheets, which comprises four side walls, a bottom wall and spring means for biasing a stack of sheets away from that bottom wall, characterised in that the edge margins of the stack are restrained against the action of the spring means as by retaining lips which project inwardly a short distance from the upper edges of the side walls, so that when a stack of sheets is in position in the container the top sheet, while contacted along its margins by such retaining means, can still photographically be exposed to a light image; and through the generally open top face of the container along two opposed regions of the side walls, the retained lip is interrupted or removed at mutually opposed regions so that by applying buckling forces the front sheet in its own plane a portion of that sheet corresponding with the interrupted regions can be caused to bulge upwardly from the container preparatory to removal of the sheet therefrom.

A container incorporating the invention can be of very simple construction and made very cheaply. The invention includes containers as defined which are marketed in filled or loaded condition and are intentionally disposable, i.e. intended to be thrown away when emptied, and also includes containers which are designed to facilitate their re-loading and re-use.

While a container according to the invention can be used for holding photographic sheets of various kinds, the invention has been made primarily to provide a container for handling flexible light-sensitive film sheets, particularly of light-sensitive silver halide type films.

The invention includes a container as hereinbefore defined loaded with light-sensitive sheets. The expression "photographic sheet pack" where used hereafter in this specification denotes such a loaded container.

A container according to the invention can be used in combination with a holder incorporating a closure member which when closed light-tightly encloses the container in the holder. Alternatively the container itself may have a closure member which when closed light-tightly encloses the contents of the container.

Any closure member as above referred to is preferably in the form of a slide which can be slid open after fitting the container or holder as the case may be, to the back of a camera.

A photographic sheet pack according to the invention can be used in the making of a plurality of photographic prints by means of a silver halide diffusion transfer process. Diffusion transfer images are formed, as is well known, by image-wise transfer of image-forming substances from an image-wise exposed light-sensitive silver halide layer or layers to a receiving layer or layers where the transferred substances are converted to a visible image. In this manner negative and positive images can be formed in the light-sensitive layer(s) and the receiving layer(s) respectively.

For use in diffusion transfer photography, film sets are known which comprise pairs of photo-sensitive and image-receiving elements and an associated envelope containing processing liquid which becomes released for its processing function when pressure is exerted which ruptures the said envelope. Such film sets are widely used in so-called instant photography.

Such film sets are very well suited for use in the amateur photographic field. Film packs are available which contain a plurality of the described film sets but in practice the packs are limited in quantity to about twelve film sets because of the rather complicated assemblage involved. If more than one film pack has to be used in making a required number of prints of a given subject, unacceptable differences between prints may be found which are attributable to variations in photographic material quality from one pack to another since the film sets in different packs may be obtained from different batches of film.

The present invention, according to a second aspect thereof, provides a novel method of forming multiple diffusion transfer images, which can be used with advantage in professional and industrial photography. The new method is characterised in that a plurality of light-sensitive sheets held as a stack in a common cassette are one by one exposed to a light image by means of a camera and dispensed directly from the cassette to a processing machine.

Any number of light-sensitive sheets can conveniently be held as a stack in the cassette. For example the latter mya contain more than twenty such sheets and even as many as one hundred such sheets.

The cassette used in a method according to the invention is preferably a container according to the invention in its first aspect as hereinbefore defined. The light-sensitive sheets are preferably dispensed from the cassette to the processing machine by a mechanism operating on a buckling-feed principle. Such mechanism may operate as known per se, or it may operate as hereinafter described. Said mechanism can incorporate the invention described and claimed in the patent application Nos. 299,010 and 299,011, filed on even date herewith, entitled "Dispenser for dispensing photographic sheets from a stack," and referring to the United Kingdom convention application No. 80 28897 filed Sept. 8, 1980.

A method according to the invention can be carried out in the following manner. A sheet pack comprising a number of photosensitive elements, is fitted in an appropriate way to the back of a camera and a first exposure is made. The sheet pack is removed from the camera, and introduced into a daylight unloader and processor. Both steps are carried out light-tightly.

The unloader operates to separate the exposed sheet from the sheet pack by the buckling of the upper sheet under the influence of compression forces in the sheet. To that end, the unloader may comprise friction members for biasing the upper sheet in its own plane in one direction, whereby the sheet will buckle in a direction normal to said biasing direction. The buckling of the sheet occurs at the regions which are outside the limits of the sheet retaining means.

The processor makes the exposed photosensitive sheet contact first the processing liquid, and next an image-receiving sheet that may either manually or automatically be supplied.

The sheet retaining means of the container may be designed to include detent means at points located between the interrupted regions, i.e. where the retaining means are absent and a common end-wall of the container, which detent means project toward the bottom-wall of the container a distance at least equal to the thickness of one sheet, thereby to constitute sheet buckle locking means. The advantage of this feature is that a sheet, once it has been withdrawn from below such detent means, by the buckling of a portion of the sheet through the interrupted regions of the retaining means, cannot slide back flat into the sheet pack by the elasticity of the sheet, since the trailing edge of the slid-away portion of the sheet abuts against such detent means.

The sheet-buckle detent means may moreover operate to release an end portion of the buckled sheet from the biasing force of the spring means of the sheet pack, since the next sheet is at least partially prevented from transmitting the biasing force to the first sheet by the detent means as will be explained further in the description of the invention.

The bottom surface of the container member that is in contact with the rear-side of the last sheet of the stack of sheets may have a friction coefficient with respect to said sheet that is greater than the mutual friction coefficient between the sheets. Consequently, the next to last sheet can be withdrawn separately from the last sheet. The latter situation notably occurs when the last sheet is contacted by a smooth-surfaced biasing plate consisting of plastic, metal, or the like. Suitable measures for increasing the coefficient of friction of the bottom surface of the container member that is in contact with the rear-side of the last sheet comprise the provision of friction strips of rubber or the like, the surface roughening of said member, etc.

Figure 6:
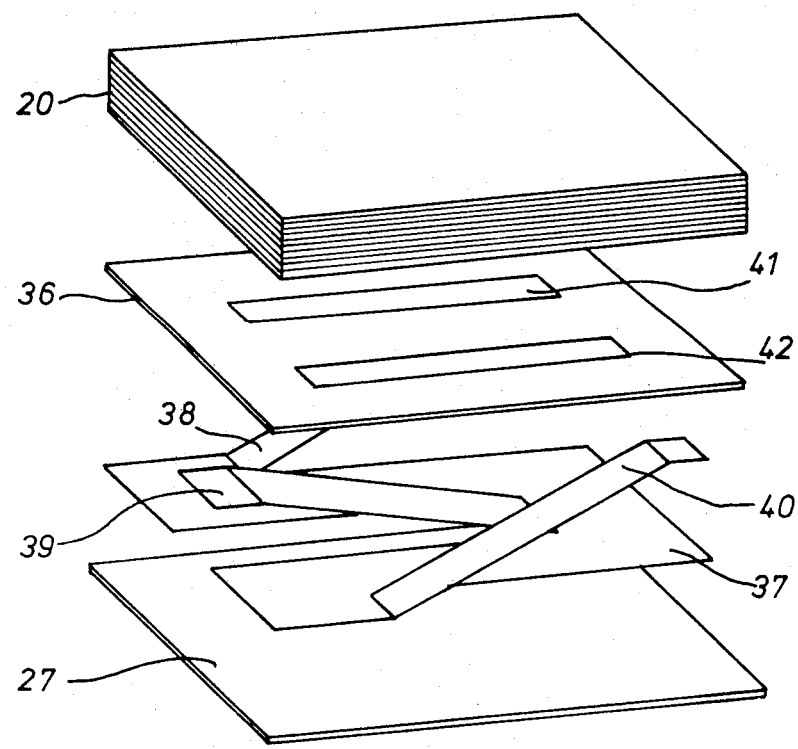
Figure 7A:
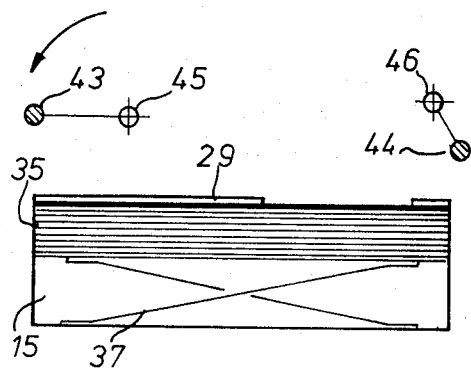
Figure 7B:
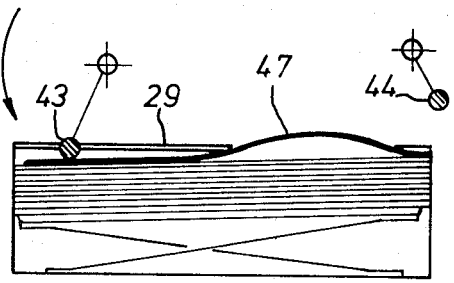
Figure 7C:
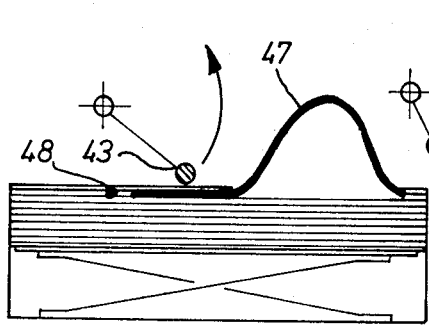
Figure 7D:
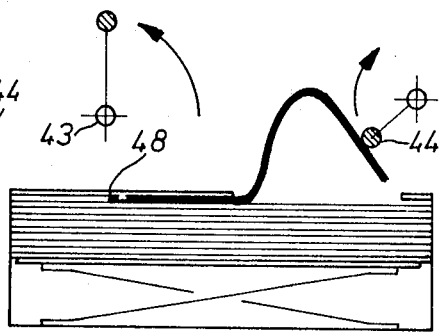
Figure 7E:
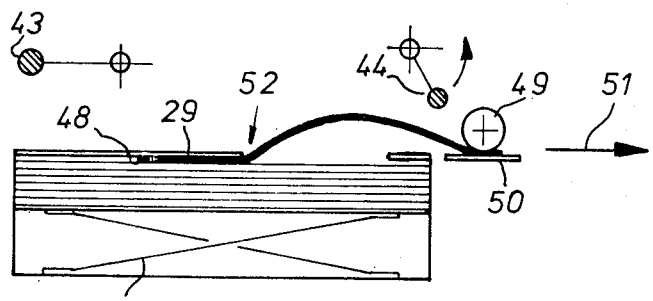
Figures 8, 9:
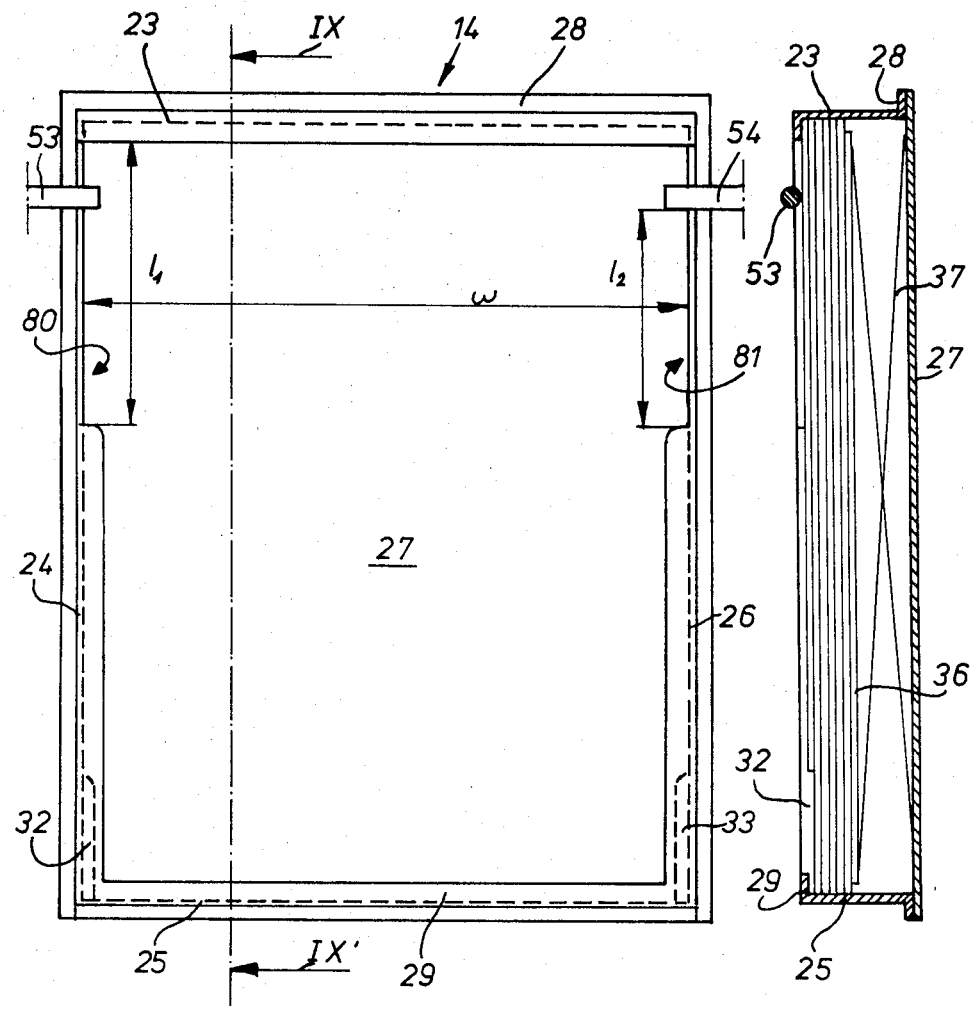
Figure 10:
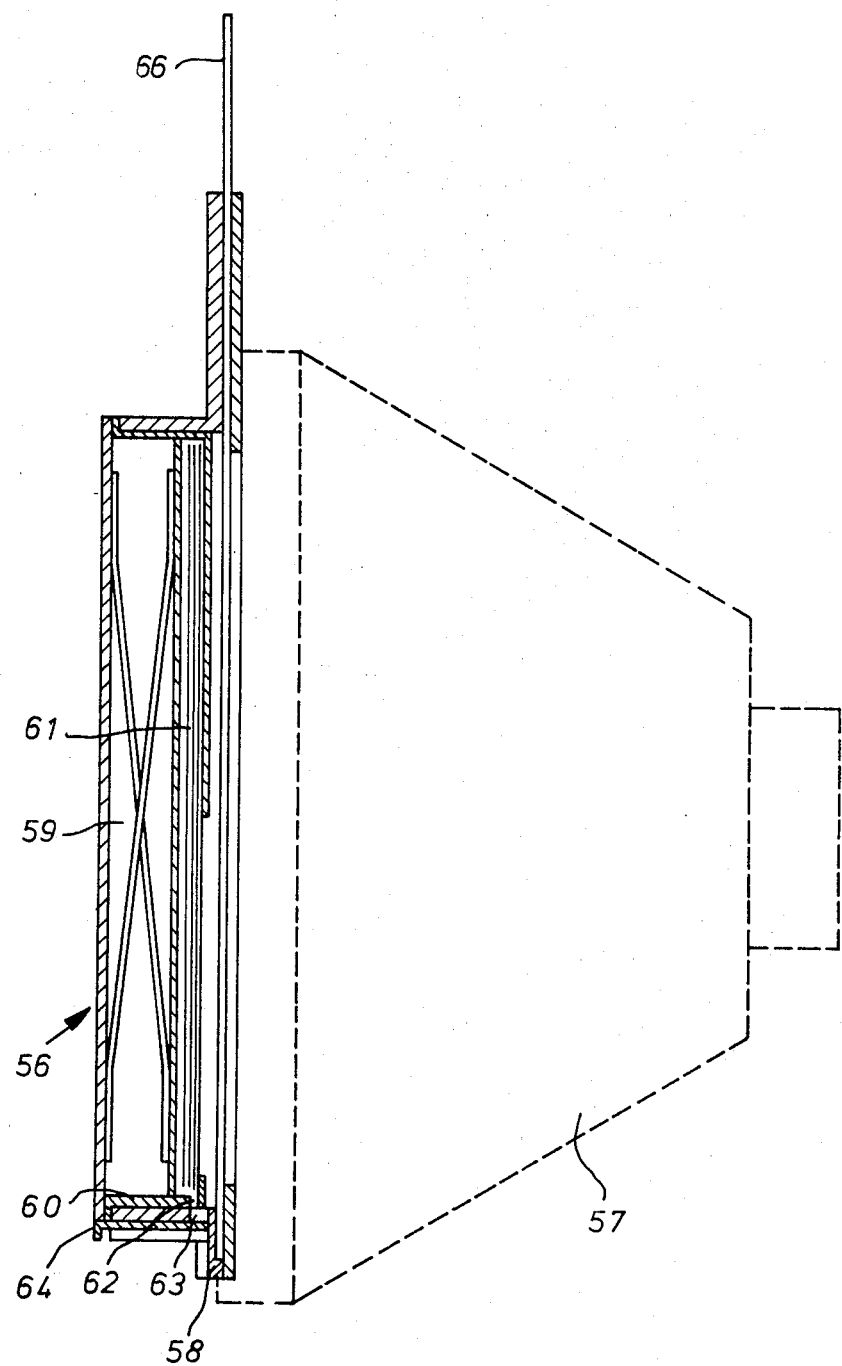

The invention will be hereinafter described by way of example with reference to the accompanying drawings wherein:

FIG. 1 is a cross-sectional representation of one embodiment of a sheet pack according to the present invention, fittred into a pack holder that is attached to a camera, FIG. 2 is a plan view of the sheet pack according to FIG. 1, and FIG. 3 is a cross-sectional view on line III–III' of FIG. 2, FIG. 4 is an enlarged view of the lower part of FIG. 3, and FIG. 5 is a detail view of a corner portion of the container, viewed from inside of the container with the rear or bottom wall removed, FIG. 6 illustrates the sheet biasing means of the sheet pack, FIGS. 7A to 7E illustrate the withdrawal of a sheet from the pack, FIG. 8 is a plan view of another embodiment of a sheet pack according to the invention, and FIG. 9 is a section on line IX–IX' of FIG. 8, FIG. 10 is a cross-sectional representation of a further embodiment of a sheet pack according to the invention, fitted to a co-operating pack holder that is shown attached to a camera, and FIGS. 11A to 11E illustrate the withdrawal of a sheet from a sheet pack according to FIG. 10.

Referring to FIG. 1, a photographic sheet pack 15 comprising a container 14 and an enclosed sheet stack 20 is fitted into a pack holder 16 that is attached to the rear of a camera 17 illustrated in broken lines. The camera may be a professional or semi-professional type camera for making passport photographs, studio exposures for the production of lay-outs, etc. The camera may be designed to accept a novel type of pack holder itself, but preferably the pack holder is designed to adapt the new sheet pack according to the invention, to the rear of an existing camera. In this way, the new sheet pack may simply be substituted for known film packs of an other type, for instance of the type as described in the introduction of the specification.

The pack holder 16 is provided with a dark slide cover 18, that is adapted to be withdrawn from the exposure aperture when an exposure to be made, and is closed to permit the removal of the pack holder with the sheet pack from the camera in daylight conditions, after the exposure.

The sheet pack 15 fits light-tightly in the pack holder 16 and is secured thereto by means, not shown. The loading of the sheet pack into the pack holder may occur in the darkroom.

The sheet pack has a generally open front wall identified generally by the number 19 through which the image-wise exposure of the uppermost sheet of the stack 20 of light-sensitive sheets may occur in the camera. The sheets are biased in the direction of the exposure aperture by spring means 21 compressed between a pressure plate 22 and the bottom wall of the pack.

The sheet pack 15 is described in detail hereinafter with reference to FIGS. 2, 3 and 4, the sheets and the biasing means being omitted in FIGS. 2 and 4 for clearness' sake. It should be understood that the sheets fit into the container 14 with a clearance of some tenths of a millimeter between the sheet edges and the interior faces all of the corresponding side-walls of the container.

The container 14 has side-walls 23, 24, 25 and 26, and a bottom or back wall 27. The bottom-wall is fitted to an outwardly extending peripheral flange 28 around the side-walls of the container. The back-wall may be removably fitted to the container to permit the re-loading of the container. However, according to a preferred embodiment of the invention the sheet pack container is a disposable container, and in such case the back-wall may be permanently fixed to the container by glueing, welding, or the like.

The open front of the container is provided with sheet retaining means that extends along the side-walls and that is formed by inwardly projecting lip or flange 29 that extend parallel with the back-wall of the container from the upper edges of the side walls with a width a ranging approximately between 2 and 5 mm. On two opposed side walls 30, 31 the flange is interrupted symmetrically at two opposite positions 30 and 31 over a length l that suffices to permit the upper sheet of the stack to be buckled sufficiently to permit its removal from the container as will further be explained hereinafter. Over the interrupted lengths 30, 31, the lip 27 is completely removed so that the width at points is the full width w equal to the interior distance between the corresponding side-walls 24 and 26. The location of the interruptions 30 and 31 may be as illustrated in FIG. 2, but these interruptions may be also situated nearer to one end-wall of the container, as will be described later.

Near one pair of corners, the lip 29 is provided on its undersurface with sheet-buckle detent elements 32 and 33. These detent elements are formed by downward projections or shoulders that are spaced from the bottom wall a distance b (see FIG. 4) that is smaller than the normal distance c to the underface of the remainder of the sheet retaining lip 29 by a value d at least equal to the thickness of one sheet. In the present case, the distance c is the normal interior distance between lip 29 and the bottom wall 27 of the container, and the distance d represents the thickness of the detent elements which can be considered as a ridgelike shoulder at two opposite points on the inner face of the peripheral lip that are near the two adjacent corners of the container.

As to the other dimensions of the locking members the following considerations may apply. The length e (see FIG. 5) is determined by the distance over which an edge of the upper sheet is slid away from the corresponding end wall in forming the buckle, as will further be explained with reference to FIGS. 7A to 7E. In fact it is only the free or inner end of a sheet-buckle detent element, as indicated by the arrow 34 in FIG. 4, which serves to deter or lock the buckled sheet from returning to a flat condition. In other words, it is only the inner abutment of that locking shoulder which engages the trailing edge of the buckled sheet. It is therefore not essential for the detent elements to extend entirely back to the common side-wall 25 (as indicated in FIG. 4). However it is not desirable for the detent elements to be as short that excessive localised pressure is exerted on the sheets that are biased against such members.

In the case of light-sensitive sheets that are rather pressure-sensitive, it may therefore be necessary to make the detent element extend the full distance to the common side-wall of the pack as seen in FIGS. 2 and 5.

Whereas the height d of the detent shoulders could be smaller than the thickness of one sheet and still fulfil the function of sheet-buckle arresting means, dimension d should preferably be at least equal to the thickness of one sheet in order to fulfil a second function, namely the elimination, or at least a considerable reduction, in the biasing force acting on the trailing portion of the upper sheet once the buckle in the sheet has been produced.

It will be understood that, when the trailing end of the upper sheet has been slid beyond the detent element 32, 33, the biasing force on the other sheets is for a considerable part applied to the underside of the locking element. The upper sheet thus is no longer tightly pinched between the next underlying sheet (pressed upward by spring 21) the sheet retaining lip adjacent the corresponding corners, so that its subsequent removal is facilitated.

Finally, the width g of the sheet-buckle detent elements 32 and 33 may be smaller than the width f of lip 29, as indicated in FIG. 5, whereby an occasional curvature of the sheet corners as a consequence of the increased bias by the numbers 32 and 33 is confined beneath the lip and does not extend beyond the border of the open face of the container, so that the exposed, i.e. accesible, sheet portion will always be perfectly flat.

The stack biasing means of the container is illustrated in detail in the exploded view of FIG. 6. The stack of sheets 20 rests on a pressure plate 36 of a size corresponding approximately with the size of the film sheet. The pressure plate 36 is biased by spring means in the form of a plate 37 of spring steel or the like that has been cut and bent into fingers 38, 39 and 40 that are capable of producing a substantially constant bias on the stack, irrespective of the number of sheets which it contains and even in fact if only one sheet is left in the container.

The plate 37 may rest unattached to the bottom-wall 27 of the container.

The pressure plate 36 may be provided with friction strips as at 41 and 42 that ensure that the coefficient of friction between the upperside of the plate and the rearside of the last sheet of the stack, is at least equal to and preferably larger than the coefficient of friction between adjacent film sheets themselves.

The removal of the upper sheet from the sheet pack will now be described with reference to FIGS. 7A to 7E which illustrate the successive positions of two co-operating friction members of a sheet unloader or dispensing unit that engage the upper sheet. As mentioned already in the preceding introduction, the operation of the friction members is based on the coefficient of friction of the members relative to the upper face of the sheets, which should be greater than the mutual friction coefficient between adjacent sheets themselves. The friction members 43 and 44 may be rubberlike rods arranged to swing about pivots such as 45 and 46, but any other arrangement that is suited for performing the functions that will now be described, may be used. The friction members 43 and 44 may suitably have a length that is approximately equal to half the sheet width.

Referring to FIGS. 7A and 7B, the friction member 43 is rotated in the direction of the corresponding arrow so that the upper sheet of the stack of sheets is engaged, slightly pressed downwardly against the bias of the spring means, and finally urged to the right hand side according to the figures.

The compressive force on the sheet in its own plane causes the sheet to buckle at the place where it is free to do so, i.e. at the opposed interruptions 30,31 in the lip 29. The sheet is buckled to a position indicated at 47 in FIG. 7C when contact between the friction member 43 and the sheet is broken by the continued pivotal movement of member 43. The following may then occur. If the buckling resistance of the sheet is relatively small, the unbuckled left-hand sheet portion may remain in the position as illustrated in FIG. 7C. If, on the contrary, the buckling resistance is relatively high, and the thickness of the buckle detent element represented schematically in FIGS. 7A-# as a pin 48, is equal to or greater than the thickness of one sheet, the sheet will tend to resume its flat shape until the trailing sheet edge abuts against the pin 48.

The next step in the withdrawal of the sheet is performed by a second member 44 that is now rotated as illustrated in FIG. 7D in order to engage the opposite end of the sheet and withdraw its leading end from beneath the overlying portion of lip 29 at that end of the container.

When the friction member 44 reaches a near horizontal position, and the leading end of the sheet is released from the lip, the sheet becomes free to flatten under the elastic recovery forces in the sheet (see FIG. 7E), whereby the right-hand sheet end portion is caused to project beyond the boundary of the sheet pack since the left hand has been permanently displaced to the right. This projecting sheet-portion may be engaged by a roller 49 co-operating with a backing plate 50 with a low friction coefficient in order to remove the sheet from the pack in the direction of the arrow 51. An alternative sheet transport mechanism may comprise two co-operating pressure rollers. The friction member 44 after reaching its horizontal position above referred to is rotated back to its original position as indicated in FIG. 7E.

The removal of the top sheet by the roller 49 is facilitated by the fact that the trailing portion (i.e., left-end portion) of the next sheet is held separated from the lip 29 of the container a distance equal to or larger than the thickness of the sheet being removed, i.e., by the height of the sheet-buckle detent element 32(48). Consequently the displaced (left-hand) end portion of the sheet is practically free of the biasing force of the spring means 37, and the removal of the upper sheet may occur almost without frictional restraint and without risk of entrainment of the next sheet.

It will be understood that a thickness d of the sheet-buckle detent element 32(48), that is exactly equal to the sheet thickness still causes a slight pinching of the end portion of the upper sheet, since the stack of sheets will have a very slightly sloping position because at the right-hand side, according to the FIGS. 7D and 7E, the stack is not held downwardly by any detent element. Thus there may occur some pressure at the margins of the upper sheet at the part of the lip 29 indicated by the arrow 52 in FIG. 7E. If such pressure is detrimental to the proper sheet withdrawal, a thickness d of the sheet-buckle detent element slightly larger than the thickness of one sheet may be appropriate.

Another embodiment of a sheet pack according to the invention is illustrated in FIGS. 8 and 9. This embodiment differs from the embodiment shown in FIGS. 2 and 3 only by the location of the interruptions in the sheet-retaining lip here designated 80 and 81, which now extend all the way to the inner edge of lip 29 on the common side-wall 23. The withdrawal of the upper sheet from the pack occurs as described with reference to FIGS. 7A to 7E.

As shown in FIGS. 8 and 9 sheet retaining means independent from the stack container, such as the pins 53 and 54, may be provided. These pins may form part of a pack holder, such as the one described at 16 with reference to FIG. 1, and they may be fitted on the sidewalls of such holder in such a way that they take a position with respect to a sheet pack as illustrated in FIGS. 8 and 9, once such sheet pack has been properly fitted into the pack holder.

The advantage of these separate sheet retaining means is as follows. It may happen that difficulties may arise with the flatness of the stacked sheets, and with the flatness of the upper sheet in particular, at the position of the interruptions. Such a lack of flatness is caused by the elasticity of the stack of sheets, whereby the thickness of the stack may be slightly larger at the regions where there is no retaining lip 29 and no restraint against the underlying stack pressure.

It has been found that in certain cases, e.g. when the container is a moulded construction, some difficulties may arise because of insufficient rigidity of the sheet retaining means, such as the peripheral lip 29, and in such case it may be desirable to make the interrupted regions somewhat longer than actually necessary and to apply restraining force on the sheets at least partly by additional, more rigid, sheet retaining means situated within such flangeless regions. In the illustrated example of FIG. 8, the operative buckling length is $l_2$, as compared with the actual length $l_1$ of the interrupted regions 80, 81 of the lip.

A still further embodiment of a sheet pack according to the invention is illustrated in FIGS. 10 and 11A to 11E.

Referring to FIG. 10, the sheet pack 56 that is fitted to a camera 57 by means of a pack holder 58 comprises a generally rectangular container 59, one side-wall 60 of which is provided with a slot 62 through which the sheets 61 may be withdrawn one at a time subsequent to exposure. The pack holder 58 comprises a corresponding slot 63 that may be light-tightly closed by means of a dark slide 64 that is diagrammatically illustrated only. Locking means, not illustrated, may be provided for preventing the dark slide 64 from accidentally opening while the sheet pack is on the camera. The locking means and the dark slide may be arranged in such a way that opening of the slide 64 is possible only in an automatic unloader for withdrawal of the exposed sheet. The pack holder 58 has a dark slide cover 66, the operation of which is similar to the operation of the slide 18 of the pack holder 15 shown in FIG. 1.

The withdrawal of the upper sheet from the pack is described hereinafter by way of example with reference to FIGS. 11A to 11E.

Figure 11:
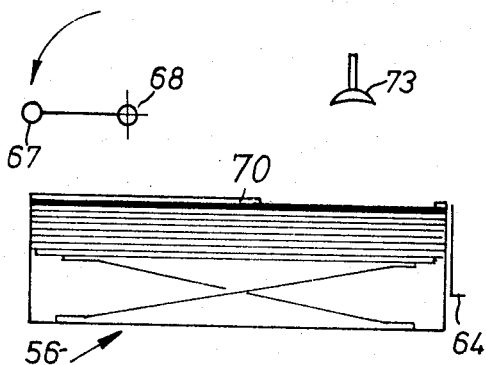
Figure 11:
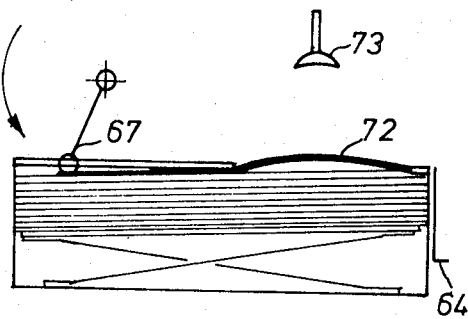
Figure 11:
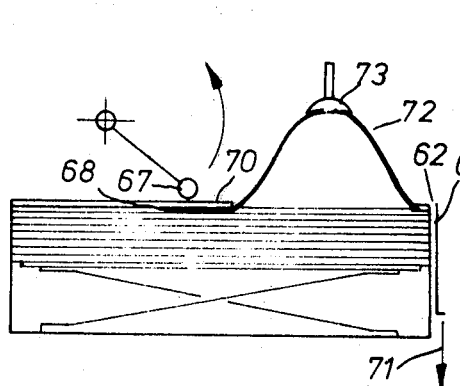
Figure 11:
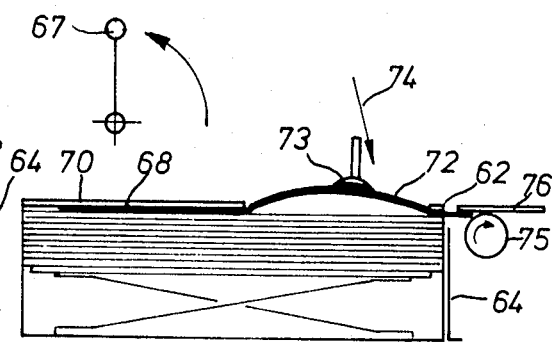
Figure 11:
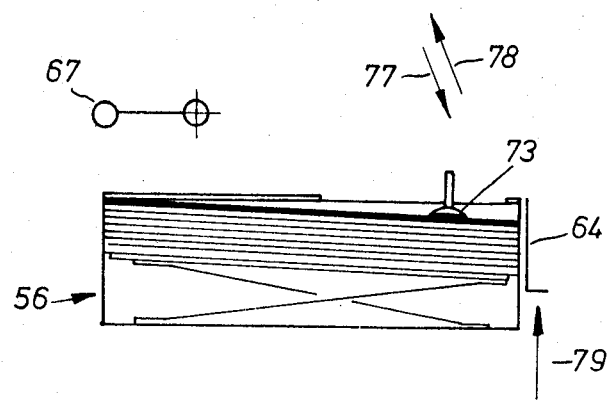

A friction member 67 that is rotatable about a point 68, is turned in the direction of the arrow to engage the upper sheet, as illustrated in FIGS. 11A to 11B. As the friction member moves away from contact with the sheet, the displaced sheet portion takes a buckled position as illustrated in FIG. 11C. The trailing sheet portion may remain clamped between the sheet retaining lip 70 and the next sheet, and keep thereby the position as shown, or it may slide slightly backwardly due to sheet elasticity until its trailing edge abuts against the sheet-buckle detent element, indicated schematically at 68.

The removal of the sheet continues as follows.

The dark slide 64 is pulled downwardly by means, not illustrated, in the direction of the arrow 71 in FIG. 11C, so that the discharge slot of the cassette holder 58 and the slot 62 of the sheet pack are open. The sheet buckle 72 remains unchanged because the leading end of the sheet remains firmly biased against the portion of the lip 70 at the exit slot 62.

A sheet flattening member 73, that may have the form of an inverted gutter or channel extending transversely of the sheet, and may be made of a resilient material such as rubber, or the like, is actuated to push the buckle 72 downwardly in the direction of the arrow 74, see FIG. 11D. The flattening of the sheet buckle causes first the trailing sheet edge to firmly bear against the locking element 68. Then the forward sheet end is caused to pass through the slot 62 and to leave the sheet pack. The protruding sheet end may be a gripped by suitable sheet withdrawing means such as a driven roller 75 co-operating of a wall 76 with low friction coefficient, and transported for instance towards a device for the wet processing of the sheet and the application of an image-receiving sheet.

When the sheet has been completely removed and the slide 64 has been closed in the direction of the arrow 79, the sheet flattening member 73 is lowered according to the arrow 77 as far as beyond the plane of the open face of the container, as illustrated in FIG. 11E, whereby the next sheet, is flattened back into place in case it should have followed to a lesser or greater extent the buckling of the withdrawn upper sheet.

Finally, member 73 is removed from the stack in the direction of the arrow 78 to a position as illustrated in FIGS. 11A and 11B, while friction member 67 is swung to its starting position wherein its supporting arm is almost horizontal. It is recalled that the flattening member 73 is not intended to create a suction but, on the contrary, is a flexible member that is capable of adapting to a large extent to the changing curvature of the sheet portion which is contacted thereby.

Although the container of a sheet pack according to the invention may be made from metal or the like, a preferred material for the container is plastic, and in consequence injection moulding as well as vacuum moulding of the pack may be considered.

The sheet pack may be light-tightly and air-tightly sealed by means of a known foil lamina comprising layers of polyethylene and aluminium, that is sealed over the exposure opening of the pack.

The sheet pack may contain types of material other than described hereinbefore, for instance silver halide film or paper sheets that are capable of producing a direct positive image in liquid processing.

The unloading of a sheet pack may also occur by means of a roller co-operating with the pack holder rather than with a separate wall 50 and 76 as illustrated in FIGS. 7E and 11D. Thus an unloading apparatus may be arranged in such a way that it comprises an unloading roller that co-operates with the face 81 of the cassette holder 16 in FIG. 1, to engage and remove the leading end of the sheet that has moved onto such face by the straightening of the sheet buckle. Preferably, this face 81 of the sheet pack has a reduced coefficient of friction. This may suitably be obtained by providing such face with a self-adhesive strip of Teflon tape or the like, or by coating such face with a Teflon spray.

The site of the interruptions of the sheet retaining lips may take different positions as illustrated already in FIGS. 2 and 8. While theoretically any position enables the formation of a buckle in the upper sheet, a position of the interruptions symmetrically with respect to the length of the corresponding side walls may give less satisfactory results because the length of sheets that remains engaged after the sheet buckle has been released is rather limited so that the risk increases for the withdrawn sheet to take a skewed position. Therefore, a preferred location of the interruptions is entirely on one side of the center line of the corresponding side-walls of the container. The container of the sheet pack may be provided with notches, recesses, or the like, that may co-operate with suitable arrangements on the pack holder, thereby to ensure that the sheet pack is oriented in the holder with the interruptions situated at the correct side of the pack holder. The sheet pack may contain different numbers of sheets. Suitable loadings include 25 and 100 sheets per pack. The dimensions of the sheets of the packs are not subject to particular limitations. Suitable dimensions of the sheets that correspond with the exposure plane of commonly used camera are 4×5 inches, and 9×12 cm.

Finally, the container of a sheet pack according to the invention may be formed as a holder complete with a dark slide cover of a type as illustrated in FIG. 1. In such embodiment, the holder, which preferably is disposable, preferably contains at least 100 light-sensitive sheets for reasons of economy.

We claim:

1. A container suitable for holding in generally flat condition a stack of photographic sheets of generally equal size, said container comprising four side walls and a bottom wall for receiving a stack of said sheets, spring means for biasing said stack of sheets away from said bottom wall, stack retaining means for retaining the stack within said side walls against the action of said spring means, said retaining means projecting inwardly from the edges of said side walls over and in contact with only the side margins of said sheets, leaving the remainder of the sheet area accessible for photographic exposure to a light image, an opposite two of said side walls having matching portions thereof free of said stack retaining means to leave corresponding opposed sections of said sheet margins unretained, whereby the application of buckling forces to said front sheet in its own plane causes that portion of said sheet having the unretained margins to buckle upwardly from the sheet plane preparatory to removal of the thus-buckled sheet from said stack, and sheet-buckle detent means projecting below the plane of said top sheet a distance at least equal to about the thickness of one of said sheets at points on said two opposite side walls spaced substantially a common distance from a common side wall, whereby said top sheet after having undergone buckling is prevented by abutment of an edge from returning to said original flat condition in the container.

2. A container according to claim 1, wherein said sheet retaining means is in the form of an inwardly extending peripheral lip at the upper edges of said side walls.

3. A container according to claim 3, wherein said sheet-buckle detent means is formed by a downwardly directed shoulder at said points on the underside face of said flange.

4. A container according to claim 3, wherein the extent of inner projection (g) of said shoulder is smaller than that (f) of the lip.

5. A container according to claim 3, wherein the height (d) of said shoulder is at least as great as the thickness of one sheet and at least less than that of two sheets.

6. A container according to claim 1, wherein said matching opposed regions free of said stack retaining means are located entirely on one side of the center line of the corresponding opposed side walls.

7. A container according to claim 1, which is fitted on its generally open top face with a dark slide operable to close said face to light.

8. A container according to claim 1, in combination with a holder which is provided with a dark slide and which is adapted for attachment to the rear-side of a camera, and wherein said holder has stack retaining means at locations coinciding with said matching opposed side wall regions of said container which are free of said stack retaining means.

9. A container according to claim 1, containing a stack of sheets each carrying a light-sensitive silver halide layer thereon.

* * * * *

UNITED STATES PATENT OFFICE
CERTIFICATE OF CORRECTION

Patent No. 4,388,992           Dated June 21, 1983

Inventor(s)   Hugo F. Deconinck

It is certified that error appears in the above-identified patent and that said Letters Patent are hereby corrected as shown below:

In the Claims:

Claim 3, line 1, "3" should read -- 2 --.

Signed and Sealed this

Sixteenth Day of August 1983

[SEAL]

Attest:

Attesting Officer

GERALD J. MOSSINGHOFF

Commissioner of Patents and Trademarks